(12) United States Patent
Stamoulis et al.

(10) Patent No.: US 8,903,321 B2
(45) Date of Patent: Dec. 2, 2014

(54) SYSTEM AND METHOD FOR NETWORK MANAGEMENT

(75) Inventors: Anastasios Stamoulis, San Diego, CA (US); Arnab Chakrabarti, San Diego, CA (US); Dexu Lin, San Diego, CA (US); Kambiz Azarian Yazdi, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/526,762

(22) Filed: Jun. 19, 2012

(65) Prior Publication Data

US 2012/0289248 A1 Nov. 15, 2012

Related U.S. Application Data

(62) Division of application No. 12/507,980, filed on Jul. 23, 2009.

(60) Provisional application No. 61/083,840, filed on Jul. 25, 2008, provisional application No. 61/083,845, filed on Jul. 25, 2008.

(51) Int. Cl.
*H04B 1/00* (2006.01)
*H04W 24/02* (2009.01)
*H04W 72/08* (2009.01)

(52) U.S. Cl.
CPC ............ *H04W 24/02* (2013.01); *H04W 72/082* (2013.01)
USPC .............. 455/63.1; 455/522; 455/69; 455/70; 455/67.11; 370/315; 370/316; 370/317; 370/318; 370/319

(58) Field of Classification Search
USPC ................ 455/522, 69–70, 63.1, 67.11, 269; 370/315–320
See application file for complete search history.

(56) References Cited

U.S. PATENT DOCUMENTS

| 5,095,500 | A | 3/1992 | Tayloe et al. |
| 6,266,514 | B1 | 7/2001 | O'Donnell |
| 6,804,522 | B2 * | 10/2004 | Lindskog et al. ............. 455/450 |
| 6,912,575 | B1 | 6/2005 | Swift et al. |
| 7,898,952 | B2 * | 3/2011 | Kim et al. ..................... 370/232 |

(Continued)

FOREIGN PATENT DOCUMENTS

| CN | 1295388 A | 5/2001 |
| CN | 1600040 A | 3/2005 |

(Continued)

OTHER PUBLICATIONS

International Search Report and Written Opinion—PCT/US2009/051759—ISA/EPO—Oct. 29, 2009.

(Continued)

*Primary Examiner* — Fayyaz Alam
(74) *Attorney, Agent, or Firm* — Dalei Dong

(57) ABSTRACT

Various systems and methods for network management are disclosed. In one embodiment, a network management system comprises a receiver for receiving data from a plurality of entities, including base stations and/or subscriber handsets, a processor for generating a network map or a recommendation based on the received data, a display device for displaying the network map or recommendation, and a transmitter for transmitting instructions based on the recommendation.

27 Claims, 11 Drawing Sheets

(56) References Cited

U.S. PATENT DOCUMENTS

| | | | |
|---|---|---|---|
| 8,000,257 B2 * | 8/2011 | An et al. ................ | 370/252 |
| 8,005,030 B2 | 8/2011 | Stephenson et al. | |
| 8,139,503 B2 | 3/2012 | Xu et al. | |
| 8,150,344 B1 * | 4/2012 | Goyal et al. ............. | 455/130 |
| 2004/0097237 A1 | 5/2004 | Aoyama | |
| 2004/0127259 A1 | 7/2004 | Matsunaga | |
| 2004/0203717 A1 | 10/2004 | Wingrowicz et al. | |
| 2005/0090263 A1 | 4/2005 | Ebata | |
| 2005/0136911 A1 * | 6/2005 | Csapo et al. ............ | 455/423 |
| 2005/0237968 A1 | 10/2005 | Womack et al. | |
| 2006/0087974 A1 | 4/2006 | Ozer et al. | |
| 2006/0105759 A1 | 5/2006 | Betge-Brezetz et al. | |
| 2006/0128372 A1 | 6/2006 | Gazzola | |
| 2007/0082677 A1 | 4/2007 | Donald et al. | |
| 2007/0155329 A1 * | 7/2007 | Mehrabanzad et al. ..... | 455/63.1 |
| 2008/0037442 A1 | 2/2008 | Bill | |
| 2008/0043679 A1 | 2/2008 | Karlsson et al. | |
| 2008/0056177 A1 | 3/2008 | Mori et al. | |
| 2008/0186862 A1 | 8/2008 | Corbett et al. | |
| 2008/0253314 A1 | 10/2008 | Stephenson et al. | |
| 2008/0305747 A1 | 12/2008 | Aaron | |
| 2009/0109939 A1 * | 4/2009 | Bhushan et al. ............ | 370/337 |
| 2009/0247148 A1 * | 10/2009 | Chen et al. ................. | 455/422.1 |
| 2010/0022263 A1 | 1/2010 | Stamoulis et al. | |
| 2010/0110905 A1 * | 5/2010 | An et al. ................ | 370/252 |
| 2010/0173644 A1 | 7/2010 | Koyanagi | |
| 2011/0065443 A1 | 3/2011 | Yellin et al. | |
| 2011/0090812 A1 | 4/2011 | Aoyama | |
| 2011/0176470 A1 * | 7/2011 | Ushirokawa et al. ......... | 370/311 |
| 2011/0199957 A1 * | 8/2011 | Oyman et al. ................ | 370/315 |
| 2012/0064909 A1 | 3/2012 | Lindoff et al. | |

FOREIGN PATENT DOCUMENTS

| | | |
|---|---|---|
| CN | 1607846 A | 4/2005 |
| EP | 1523131 A2 | 4/2005 |
| JP | 2004166056 A | 6/2004 |
| JP | 2005117357 A | 4/2005 |
| JP | 2005513932 A | 5/2005 |
| JP | 2008060994 A | 3/2008 |
| KR | 20070075569 A | 7/2007 |
| KR | 20070106046 A | 10/2007 |
| RU | 2217884 C2 | 11/2003 |
| WO | 9315569 A1 | 8/1993 |
| WO | 9805129 | 2/1998 |
| WO | 03055251 A1 | 7/2003 |
| WO | 2007063426 A2 | 6/2007 |
| WO | WO-2008039872 A2 | 4/2008 |

OTHER PUBLICATIONS

European Search Report—EP12174302—Search Authority—The Hague—Nov. 1, 2013.
Siemens, "Information to be signaled for HSDPA Call Admission Control and Congestion Control", 3GPP TSG-RAN2 Meeting #35, R2-030666, Seoul, South Korea, Apr. 7 to 11, 2003, pp. 2.
Taiwan Search Report—TW098125112—TIPO—Oct. 14, 2012.
Wireless Measurement Research and Application for GSM-R System, Sep. 15, 2007.

* cited by examiner

SYSTEM AND METHOD FOR NETWORK MANAGEMENT

CROSS-REFERENCE TO RELATED APPLICATIONS

The subject application is a divisional patent application of U.S. Ser. No. 12/507,980, filed Jul. 23, 2009, entitled System and Method for Network Management which claims priority under of U.S. Provisional App. Nos. 61/083,840 and 61/083,845, both filed Jul. 25, 2008 and both incorporated by reference herein in their entirety.

BACKGROUND

1. Field of the Invention

This disclosure relates to network management. In particular, this disclosure relates to cellular network management using indications of network quality from a plurality of entities.

2. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Interference is one of the key factors in degrading the quality of service provided by a wireless cellular network. While the negative impact of interference experienced by a certain subscriber remains confined to that subscriber, severe interference at a base station, whether it is a macro cell, pico cell, femto cell, or relay, can negatively affect many, if not all, of the subscribers served by that base station. As a consequence, it is desirable to keep the interference level at base stations low. New base stations (macro, pico, femto and relay) are deployed constantly to address the ever-increasing demands of the market, and interference conditions can change over time, e.g., as a result of change in the surrounding environment (e.g., new buildings, bridges, etc.) even for a fixed infrastructure.

Consequently, it is desirable for network operators to conduct interference surveys at base stations. Realizing the cost of such surveys, it would be advantageous to provide an efficient and inexpensive method for monitoring interference at the base station.

Another key factor in degrading the quality of service provided by a wireless cellular network is lack of coverage or low signal quality in particular areas. It is desirable, in managing a network, such as a wireless cellular network, to provide the subscribers with the best possible coverage. A number of factors (e.g., shading and inter-cell interference) can negatively affect the quality of service provided to the subscribers.

Consequently, it is desirable for network operators to conduct coverage surveys (or network quality surveys) to identify spots with poor reception and then to adjust the infrastructure (e.g., through modifying existing base stations' parameters such as transmission power or number of antennas, or through deploying additional macro, relay or femto base stations) to address the problem. However, adjusting the infrastructure, while improving the coverage at specific locations, may degrade the reception at other locations. This, of course, makes further coverage surveys desirable. Coverage surveys may also be desirable to in view of the fact that even the coverage provided by a fixed infrastructure may change over time. This may for example be due to the changes in the surrounding environment (e.g., new buildings or bridges). Realizing the cost of such surveys, it would be advantageous to provide an efficient and inexpensive method for monitoring network quality provided to the subscribers of a network.

SUMMARY OF THE INVENTION

In one embodiment, base stations (e.g., macro, pico, femto, and relay) are configured to continually measure the interference they experience, and in the case that the interference meets an alarm criterion, to notify the network operator through an alarm. In one embodiment, the alarm criterion may be that the interference level exceeds some threshold value for a prerequisite period of time. In another embodiment, the alarm can contain such information as, for example: the amount of interference, the identity of the base station experiencing the interference, the identity of the entities causing the interference, the time of measurement, and the frequency band over which the interference is experienced.

In one embodiment, the network operator can conduct complementary interference measurements upon receiving the notification and address the issue by adjusting the infrastructure. In one embodiment, there is an automated infrastructure adjustment protocol that addresses the issue automatically, upon receiving the one or more alarms.

In another embodiment, subscriber handsets are configured to determine network quality and to send a report to the network operator. The determination can be performed at a variety of times, including periodically, whenever a call is made by the subscriber, or whenever the subscriber attempts to place a call, but fails. Similar, the report can be sent to the network operator at a variety of times, including periodically, soon after the survey is conducted, and as soon as transmission is possible. The information in the report can include, for example, where the survey was conducted, the time of the survey, a measured interference level, information regarding the handset, whether a call failed, or a number of failed calls.

In one embodiment, based on the accumulated reports from the subscribers, the network operator identifies locations with poor network quality and adjusts the infrastructure to address the problem.

One aspect is a network management system comprising a receiver configured to receive, from a plurality of base stations, data indicative of network quality at the base station, a processor configured to generate a recommendation based on the received data, and a transmitter configured to transmit instructions to at least one of the plurality of base stations based on the recommendation.

Another aspect is a method of managing a network, the method comprising receiving, from a plurality of base stations, data indicative of network quality at the base station, generating a recommendation based on the received data, and transmitting instructions to at least one of the plurality of base stations based on the recommendation.

Another aspect is a network management system comprising means for receiving, from a plurality of base stations, data indicative of network quality at the base station, means for generating a recommendation based on the received data, and means for transmitting instructions to at least one of the plurality of base stations based on the recommendation.

Another aspect is a computer program product comprising a computer readable medium further comprising code for causing at least one computer to receive, from a plurality of base stations, data indicative of network quality at the base station, code for causing at least one computer to generate a recommendation based on the received data, and code for causing at least one computer to transmit instructions to at least one of the plurality of base stations based on the recommendation.

One aspect is a network management system comprising a receiver configured to receive, from a plurality of base stations, data indicative of network quality at the base station, a processor configured to generate a network map based on the received data, and a display configured to display the network map.

Another aspect is a method of managing a network, the method comprising receiving, from a plurality of base stations, data indicative of network quality at the base station, generating a network map based on the received data, and displaying the network map.

Another aspect is a network management system comprising means for receiving, from a plurality of base stations, data indicative of network quality at the base station, means for generating a network map based on the received data, and means for displaying the network map.

Another aspect is a computer program product comprising a computer readable medium further comprising code for causing at least one computer to receive, from a plurality of base stations, data indicative of network quality at the base station, code for causing at least one computer to generate a network map based on the received data, and code for causing at least one computer to display the network map.

One aspect is a network management system comprising a receiver configured to receive, from a plurality of base stations, data indicative of network quality at the base station, a processor configured to generate a recommendation based on the received data, and a display configured to display the recommendation.

Another aspect is a method of managing a network, the method comprising receiving, from a plurality of base stations, data indicative of network quality at the base station, generating a recommendation based on the received data, and displaying the recommendation.

Another aspect is a network management system comprising means for receiving, from a plurality of base stations, data indicative of network quality at the base station, means for generating a recommendation based on the received data, and means for displaying the recommendation.

Another aspect is a computer program product comprising a computer readable medium further comprising code for causing at least one computer to receive, from a plurality of base stations, data indicative of network quality at the base station, code for causing at least one computer to generate a recommendation based on the received data, and code for causing at least one computer to display the recommendation.

One aspect is a base station comprising an air interface configured to receive wireless signals, a processor configured to generate an indication of network quality based on the received wireless signals, and a network interface configured to transmit the indication of network quality.

Another aspect is a method of transmitting network quality information, the method comprising receiving wireless signals, generating an indication of network quality based on the received wireless signals, and transmitting the indication of network quality.

Another aspect is a base station comprising means for receiving wireless signals, means for generating an indication of network quality based on the received wireless signals, and means for transmitting the indication of network quality.

Another aspect is a computer program product comprising a computer readable medium further comprising code for causing at least one computer to receive wireless signals, code for causing at least one computer to generate an indication of network quality based on the received wireless signals, and code for causing at least one computer to transmit the indication of network quality.

One aspect is a network management system comprising a receiver configured to receive, from a plurality of subscriber handsets, data indicative of a position of the subscriber handset and data indicative of network quality at the position, a processor configured to generate a network map based on the received data, and a display device configured to display the network map.

Another aspect is a method of managing a network, the method comprising receiving, from a plurality of subscriber handsets, data indicative of a position of the subscriber handset and data indicative of network quality at the position, generating a network map based on the received data, and displaying the network map.

Another aspect is a network management system comprising means for receiving, from a plurality of subscriber handsets, data indicative of a position of the subscriber handset and data indicative of network quality at the position, means for generating a network map based on the received data, and means for displaying the network map.

Another aspect is a computer program product comprising a computer readable medium further comprising code for causing at least one computer to receive, from a plurality of subscriber handsets, data indicative of a position of the subscriber handset and data indicative of network quality at the position, code for causing at least one computer to generate a network map based on the received data, and code for causing at least one computer to display the network map.

One aspect is a network management system comprising a receiver configured to receive, from a plurality of subscriber handsets, data indicative of a position of the subscriber handset and data indicative of network quality at the position, a processor configured to generate, based on the received data, a recommendation, and a display configured to display the recommendation.

Another aspect is a method of network management, the method comprising receiving, from a plurality of subscriber handsets, data indicative of a position of the subscriber handset and data indicative of network quality at the position, generating, based on the received data, a recommendation, and displaying the recommendation.

Another aspect is a network management system comprising means for receiving, from a plurality of subscriber handsets, data indicative of a position of the subscriber handset and data indicative of network quality at the position, means for generating, based on the received data, a recommendation, and means for displaying the recommendation.

Another aspect is a computer program product comprising a computer readable medium further comprising code for causing at least one computer to receive, from a plurality of subscriber handsets, data indicative of a position of the subscriber handset and data indicative of network quality at the position, code for causing at least one computer to generate, based on the received data, a recommendation, and code for causing at least one computer to display the recommendation.

One aspect is a subscriber handset comprising a positioning system configured to determine a position of the subscriber handset, a processor configured to generate an indication of network quality at the position, and a transmitter configured to transmit data indicative of the position and the network quality at the position.

Another aspect is a method of transmitting network quality information, the method comprising determining a position of the subscriber handset, generating an indication of network quality at the position, and transmitting data indicative of the position and the network quality at the position.

Another aspect is a subscriber handset comprising means for determining a position of the subscriber handset, means for generating an indication of network quality at the position, and means for transmitting data indicative of the position and the network quality at the position.

Another aspect is a computer program product comprising a computer readable medium further comprising code for causing at least one computer to determine a position of the subscriber handset, code for causing at least one computer to generate an indication of network quality at the position, and code for causing at least one computer to transmit data indicative of the position and the network quality at the position.

Figure 1:
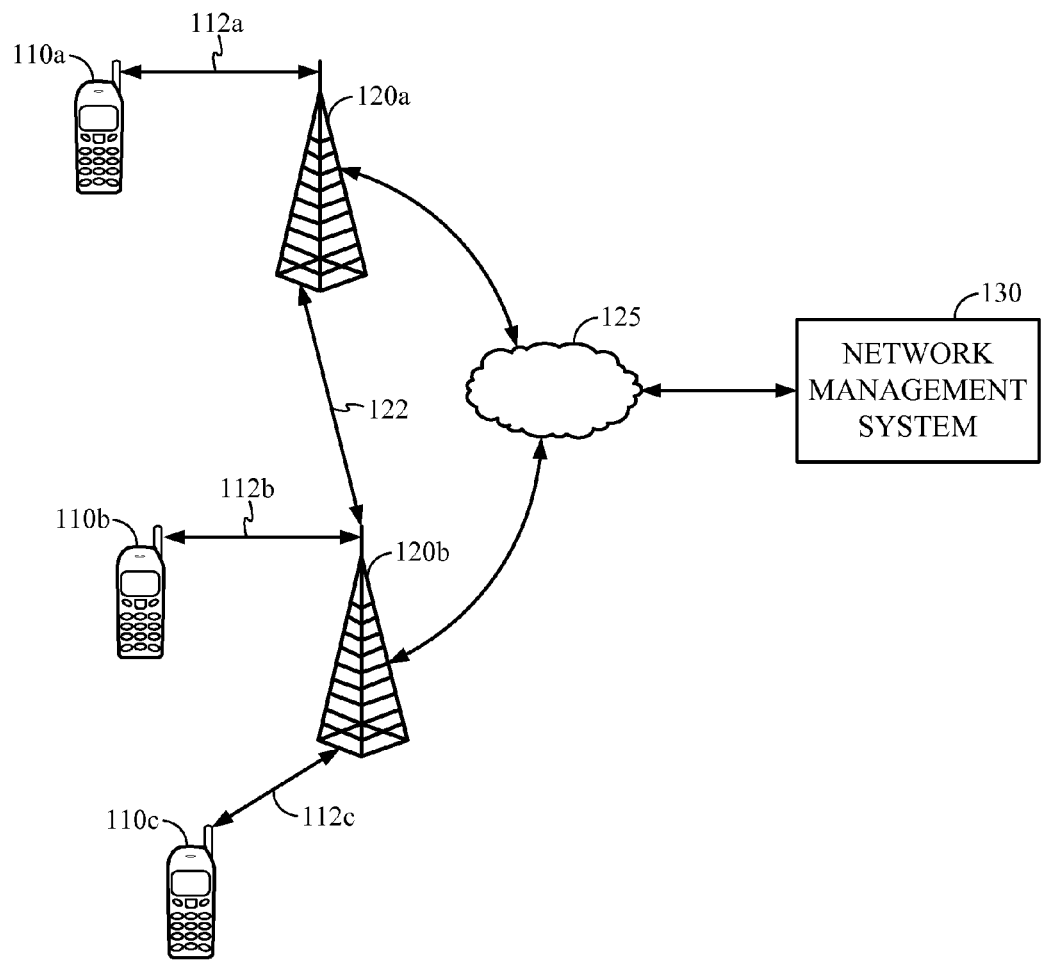
FIG. 1 illustrates a multiple access wireless communication system according to one embodiment.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION OF THE PREFERRED EMBODIMENT

The following detailed description is directed to certain specific aspects of the development. However, the development can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may performed by one or more computer processors configured to execute instructions retrieved from a computer readable storage medium. A computer readable storage medium stores information, such as data or instructions, for some interval of time, such that the information can be read by a computer during that interval of time. Examples of computer readable storage media are memory, such as random access memory (RAM), and storage, such as hard drives, optical discs, flash memory, floppy disks, magnetic tape, paper tape, punch cards, and Zip drives.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards, and others, are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, one embodiment of a wireless cellular network which may utilize one of the above-described technologies includes a plurality of subscriber handsets 110a, 110b, 110c, which communicate over wireless communication links 112a, 112b, 112c, with a plurality of base stations 120a, 120b. The base stations 120a, 120b are in communication with each other and a network management system 130 via a communication network 125. The base stations 120a, 120*b* and the network management system 130 can be connected to the communication network 125 via wired or wireless links. The base stations 120*a*, 120*b* can communicate with each other either over the communication network 125 or directly via a wireless communication link 122.

Figure 2:
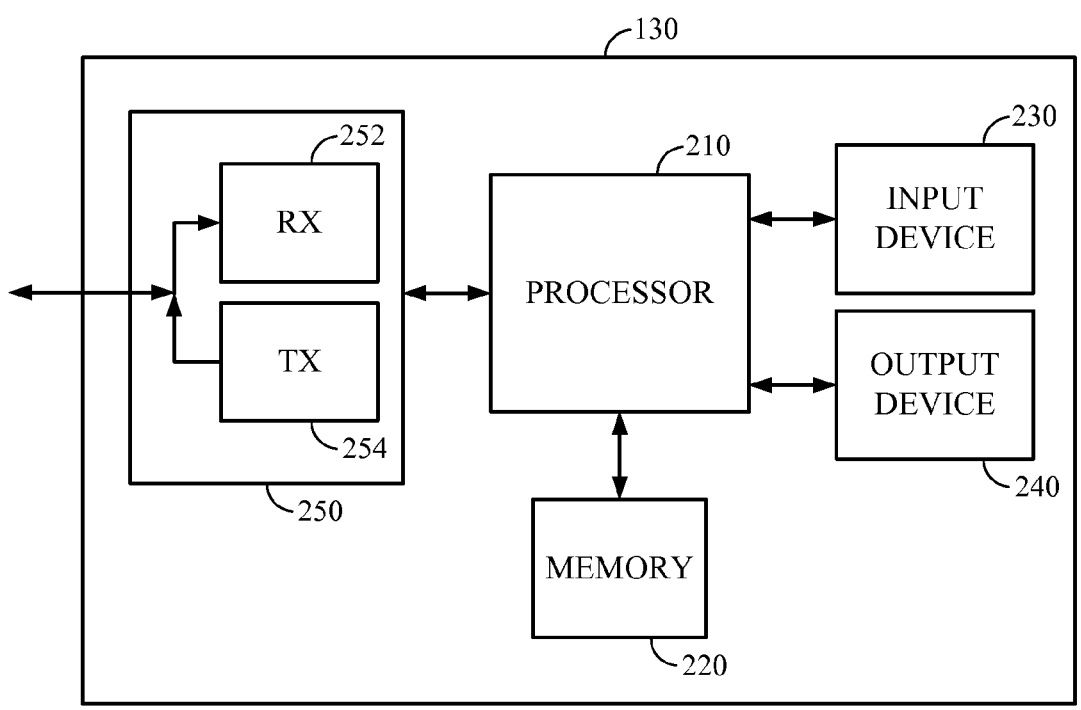
FIG. 2 is a functional block diagram of a network management system according to one embodiment.

The network management system 130, shown in detail in FIG. 2, includes a processor 210 in data communication with a memory 220, an input device 230, and an output device 240. The processor is further in data communication with a network interface 250, which includes a receiver 252 and a transmitter 254. Although described separately, it is to be appreciated that functional blocks described with respect to the network management system 130 need not be separate structural elements. For example, the processor 210 and memory 220 may be embodied in a single chip. Similarly, the processor 210 and network interface 250 may be embodied in a single chip. Likewise, the receiver 252 and transmitter 254 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 is coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the network management system 130. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, and a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a network interface 250, including a receiver 252 and a transmitter. The transmitter 254, in conjunction with the network interface 250, prepares data generated by the processor 210 for transmission over the communication network 125 according to one or more network standards. The receiver 252, in conjunction with the network interface 250, demodulates data received over the communication network 125 according to one or more network standards. In other embodiments, the transmitter and receiver are two separate components.

The network management system 130 receives, at the receiver 252, data from base stations over the communication network 125. In one embodiment, the network management system 130 receives data from a number of base stations 120*a*, 120*b* indicative of network quality at each base station or as measured by each base station.

In one embodiment, the network management system 130 receives, from a number of base stations, data including a base station identifier and an alert. The notice may be as simple as a single bit indicating that network quality is not satisfactory. The alert may be generated by the base station when certain criteria are met. For example, the base station 120*a* may transmit the alert when an interference level exceeds some threshold value for a predetermined period of time. In another embodiment, the base station 120*a* may transmit the alert when an integral of the interference level over a predetermined period of time exceeds some threshold value.

Although, in one embodiment, the data received by the network management system 130 can be as simple as a single-bit alert, in another embodiment, the network management system 130 receives more detailed information. For example, the network management system 130 can receive data including a base station identifier and the amount of interference experienced at the base station at a specific time, or over a period of time. The data can also include the identity of entities (such as other base stations) causing the interference and the frequency band over which the interference is experienced.

Although interference is a key factor in degrading the quality of service provided by a wireless cellular network, other information regarding factors that can degrade the quality of service may also be received by the network management system 130 from the base stations 120*a*, 120*b*. For example, the network management system 130 can receive data from the base stations 120*a*, 120*b* indicating their data load or a packet loss rate. The network management system 130 may further receive data indicative of a time associated with the data load or the packet loss rate.

As described above, the network management system 130 receives network quality data from the base stations. In one embodiment, the network management system 130 is configured to transmit, via the transmitter 254, a request for such information. The request can be broadcast to multiple base stations, or directed to a single base station. The request can specify a data type being requested. For example, in one embodiment the request specifies that the network management system 130 requests an interference measurement from a specific base station. In response, the network management system 130 can receive an interference measurement from the specific base station.

In one embodiment, the requests are generated automatically by the processor 210. In another embodiment, the input device 230 is used by a user to generate requests. To facilitate the generation, the processor 210 may execute a user interface program stored in the memory 220. In one embodiment, a user interface is used to indicate a geographic area in which more data is needed and, in response, the transmitter 254 transmit requests to base stations located within the geographic area. In another embodiment, the user indicates a type of information desired, such as packet loss rate, and, in response, the transmitter 254 transmits requests to base stations requesting data regarding the information desired.

The data received at the receiver 252 is processed by the processor 210 and stored in the memory 220. The memory 220 also store results obtained by the processor 210 from the data. In one embodiment, the processor 210 is configured to generate a recommendation based on the received data.

The processor 210 generates a recommendation to deploy a transmitter, such as a base station (macro, pico, femto, or relay), at a particular location. For example, if the receiver 252 receives data from a number of base stations in a particular geographic area indicating that data load is high in that area, the processor 210 generates a recommendation to deploy another base station within that area.

In another embodiment, the processor 210 generates a recommendation to mitigate interference. For example, if the receiver 252 receives data from a base station indicating that it has measured a high interference level, the processor 210 generates a recommendation that the base station increase its transmission power level. Alternatively, the processor 210 generates a recommendation that the base station perform channel orthogonalization.

As another example, if the receiver 252 receives data from a first base station indicating that it has measured a high interference level due to interference from a second base station, the processor 210 generates a recommendation that the second base station decrease its transmission power or perform channel orthogonalization. If the receiver 252 receives data from a first base station indicating a high data load and also receives data from a second, nearby, base station indicating a low data load, the processor 210 generates a recommendation to redistribute traffic between the two base stations. In instances where a recommendation is based on data from more than one base station, the processor 210 generates a recommendation for at least two of the base stations to initiate communications with each other, either directly or through the communication network 125.

The recommendation generated by the processor is stored in the memory 220 or output to a user via the output device 240. For example, the recommendation can be displayed via a monitor as part of the user interface. The recommendation can also be used by the processor 210 to generate instructions for the base stations. Instructions are transmitted to a base station via the transmitter 254. The instructions may, for example, instruct the base station to perform the recommended action. In reference to the examples above, the instructions may instruct a base station 120a to increase or decrease its transmission power level, perform channel orthogonalization, redistribute traffic, or initiate communications with another base station 120b. The processor 210 generates related instructions for multiple base stations and transmits them via the transmitter 254. For example, the instructions may be transmitted to multiple base stations instructing them to redistribute traffic or initiate communications with each other.

Although, in one embodiment, the processor 210 can use the received data to generate a recommendation, in another embodiment, the processor 210 uses the received data to generate a network map. In one embodiment, the network map is a coverage map indicating the presence and absence of network coverage at specific locations. The network map can also indicate the received signal strength, or relative received signal strength, at specific locations. The network map can indicate areas in which base stations are overloaded based on data indicative of high data load, high packet loss rate, or high interference measurements. In one embodiment, the network map is time-dependent. The network map may be displayed as part of a user interface. The network map can facilitate future network planning or current network management.

In one embodiment, the received data is indicative of network quality and further includes a base station identifier. The processor 210 associates the base station identifier with a geographic location based on a database stored in the memory 220. In another embodiment, the received data is indicative of network quality and further includes a geographic location of the base station. In another embodiment, the base station is not associated with a specific geographic location, but a relative location with respect to other base stations. The processor 210 then generates a network map in which the network quality is associated with a location. The network map can be stored in the memory 220 or output via the output device 240 or a position within a network hierarchy. In one embodiment, the network map is displayed as part of the user interface.

As described above, the network management system 130 receives, at the receiver 252, data from base stations 120a, 120b over the communication network 125. In one embodiment, the network management system 130 receives data from a number of base stations indicative of network quality at each base station or as measured by each base station. The network management system 130 is also configured to receive, at the receiver 252, data from a number of subscriber handsets. Subscriber handsets, as described further with respect to FIG. 4, may also be referred to as user equipment (UE), wireless communication devices, mobile devices, access terminals, or by some other terminology. In one embodiment, the network management system 130 receives data from a number of subscriber handsets indicative of network quality at each subscriber handset or as measured by each subscriber handset.

The data received at the receiver 252 from the subscriber handsets may be transmitted directly to the network management system 130 by the handsets, or the data may reach the network management system 130 via one or more base stations. The base stations may format or aggregate the data before it reaches the network management system. In another embodiment, the network management system 130 is part of the base station.

In one embodiment, the network management system 130 receives, from a number of subscriber handsets, data indicative of a position of the subscriber handset and a measure of network quality at the position. The data indicative of a position can be derived from a global positioning system (GPS) measurement taken at the handset, or added by one or more base stations based on triangulation. The measurement of network quality can include, among other things, an indication of the presence or absence of coverage, a received signal strength measurement, an indication of a dropped call, or an interference measurement. In one embodiment, the measurement of network quality indicates a number of attempted calls from a particular location before a successful call was placed by the handset.

As described above, the network management system 130 receives network quality data from the subscriber handsets. In one embodiment, the network management system 130 is configured to transmit, via the transmitter 254, a request for such information. The request can be broadcast to multiple handsets, or directed to a single handset. Further, the request may be transmitted to a base station, which forwards (with or without reformatting) the request to one or more handsets. As mentioned above with respect to base station information requests, in one embodiment, the subscriber handset request specifies a data type being requested. For example, the request can specify that the network management system 130 requests a coverage measurement from a geographic location about a particular base station. In response, the network management system 130 transmits a request to the particular base station, which polls the subscriber handsets serviced by the base station, and transmits the results to the network management system 130.

In one embodiment, the requests are generated automatically by the processor 210. In another embodiment, the input device 230 is used by a user to generate requests. To facilitate the generation, the processor 210 may execute a user interface program stored in the memory 220. In one embodiment, a user interface is used to indicate a geographic area in which more data is needed and, in response, the transmitter 254 transmit requests to base stations or subscriber handsets located within the geographic area. In another embodiment, the user indicates a type of information desired, such as received signal strength, and, in response, the transmitter 254 transmits requests to subscriber handsets requesting data regarding the information desired.

As described above, the data received at the receiver 252 is processed by the processor 210 and stored in the memory 220. The memory 220 also stores results obtained by the processor 210 from the data. In one embodiment, the processor 210 is configured to generate a recommendation based on the received data. The recommendation may be an alert, recommending that action be taken to rectify a problem. For example, if the received data indicates a high interference measurement, the processor 210 may generate an alert indicative of the high interference measurement.

In one embodiment, the processor 210 generates a recommendation to deploy a transmitter, such as a base station (macro, pico, femto, or relay) at a particular location. For example, if the receiver 252 receives data from a number of subscriber handsets in a particular geographic area indicating that coverage in unavailable (or that received signal strength in weak) in that area, the processor 210 generates a recommendation to deploy another base station within that area.

The recommendation generated by the processor 210 can be stored in the memory 220 or output to a user via the output device 240. For example, the recommendation can be displayed via a monitor as part of the user interface. The recommendation can also be used by the processor 210 to generate instructions for the subscriber handsets. Instructions can be transmitted to a handset via the transmitter 254, or to a handset via a base station. The instructions may, for example, instruct the handset to perform the recommended action.

Although, in one embodiment, the processor 210 uses the received data to generate a recommendation, in another embodiment, the processor 210 uses the received data to generate a network map. As described above, the received data can include a position of the subscriber handset and an indication of network quality at the position. From this information, the processor 210 generates a network map in which the network quality is associated with a location. Coverage maps, alternatively referred to as propagation maps, can be generated, as well as other network maps. The network map is stored in the memory 220 or output via the output device 240. In one embodiment, the network map is displayed as part of the user interface. A recommendation to deploy a new transmitter can be displayed on such a network map as part of the user interface.

A recommendation to deploy a new transmitter at a particular location can be based on a number of factors, including a list of available deployment locations stored in the memory 220, the number of deployed base stations near the particular location, the traffic experienced by such base stations, the population near the particular location, and other factors. For example, if a number of base stations in a particular area are experiencing high traffic or packet loss, the processor 200 can generate a recommendation to deploy a new transmitter at a particular location in the particular area based on a list of available deployment locations.

The received data, in addition to a position and an indication of network quality, can include a time of measurement. By incorporating this information, the processor 210 can improve the relevancy and accuracy of its recommendations and can also create time-dependent coverage maps. For example, by aggregating data, the processor 210 can generate a number of coverage maps for various times of the day, as conditions affecting propagation (including traffic, weather, and temperature inversions) change. Coverage maps can also be generated for various parts of the year, for example summer vs. winter coverage. Time-dependent coverage maps can also be used to demonstrate a growing network.

Figure 3:
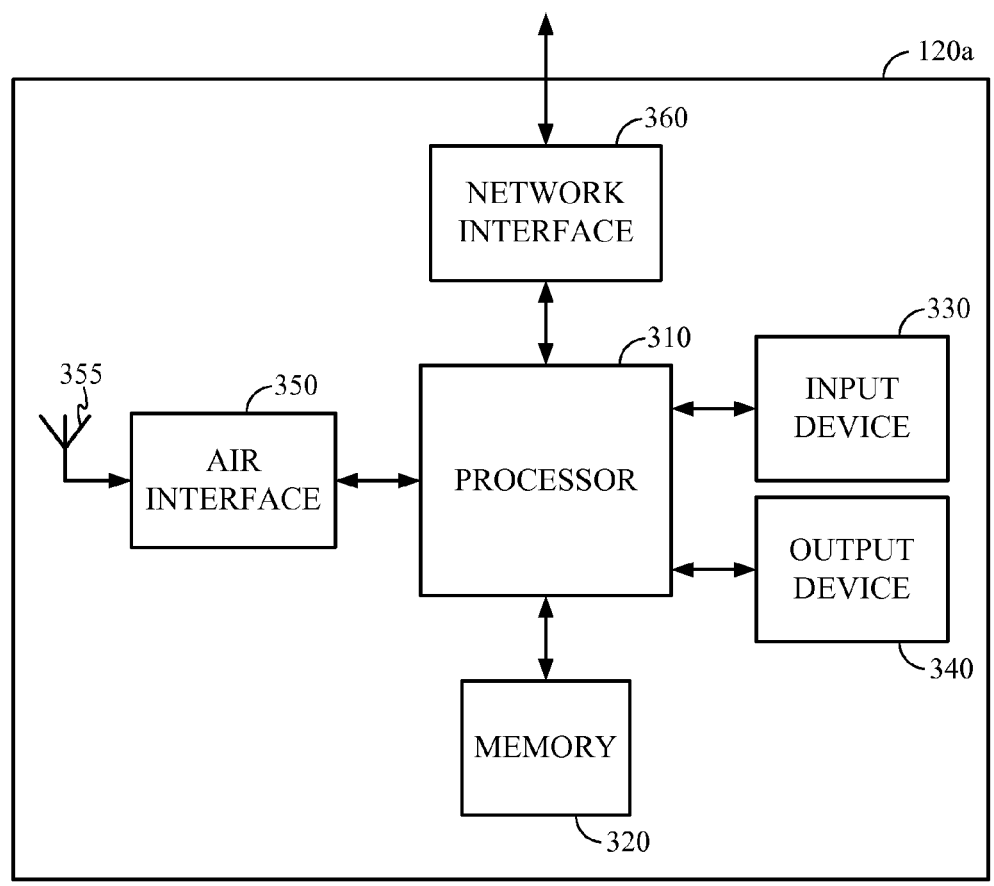
FIG. 3 is a functional block diagram of a base station according to one embodiment.

As described above, the network management system 130 receives data from one or more base stations indicative of network quality. As shown in FIG. 3, an exemplary base station 120a includes a processor 310 coupled to a memory 320, an input device 330, an output device 340, an air interface 350, and a network interface 360. Although described separately, it is to be appreciated that functional blocks described with respect to the base station 120a need not be separate structural elements. For example, the processor 310 and memory 320 may be embodied in a single chip. Similarly, the processor 310 and network interface 350 and/or air interface 360 may be embodied in a single chip.

The processor 310 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The processor 310 can be coupled, via one or more buses, to read information from or write information to the memory 320. The processor may additionally, or in the alternative, contain memory, such as processor registers. The memory 320 can include processor cache, including a multi-level hierarchical cache in which different levels have different capacities and access speeds. The memory 320 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 310 is also coupled to an input device 330 and an output device 340 for, respectively, receiving input from and providing output to, a user of the base station 120a. Various input devices and output devices are described above with respect to the network management system 130.

The processor 320 is further coupled to an air interface 350, which is capable of receiving and transmitting data via an antenna 355. The air interface 350 prepares data generated by the processor 310 for transmission via the antenna 355 according to one or more wireless standards and further demodulates data received via the antenna 355 according to one or more wireless standards.

The base station 120a is configured to generate data indicative of network quality and to transmit the data to the network management system. As described above, the base station 120a can transmit data including an interference measurement, a data load, or a packet loss rate. Further, the base station can transmit a base station identifier, an alert, and an indication of time or frequency to which the data indicative of network quality pertains.

In one embodiment, the base station 120a generates data indicative of an interference measurement by measuring the signal strength of all signals received at the antenna 355 and comparing it to the signal strength of the data signals received at the antenna 355 which are intended for the base station 120a. The data may be generated by the air interface 350 or the processor 310. The interference may include signals transmitted by subscriber handsets communicating with other base stations, or signals from other base stations transmitted to subscriber handsets. The interference can also include noise signals or data signals from entities not a part of the network. The interference may be reported to the network management system as an absolute value of the interference level, or as a signal-to-interference ratio. In one embodiment, the base station 120a also generates (and transmits) data indicative of the entities causing the interference, such as base station identifiers of other base stations.

In one embodiment, the processor 310 of the base station 120a generates data indicative of a data load or a packet loss rate in its demodulation and decoding of received signals. The air interface 350 may also contain this functionality. The base station 120a can further transmit a base station identifier stored in the memory 320, or a time at which the network quality measurement was taken by accessing a clock (not shown), which may be part of the processor 310. In one embodiment, a geographic position of the base station is stored in the memory 320.

The data generated by the base station 120a is transmitted to the network management system 130 via the network interface 360. The network interface 360 prepares data generated by the processor 310 for transmission over a network 125 according to one or more network standards and further demodulates data received over the network 125 according to one or more network standards. In one embodiment, the network interface 360 also receives requests for information from the network management system 130, as described above with respect to FIG. 2. Once receiving the request for information via the network interface 360, the processor 310, potentially in conjunction with the antenna 355 and air interface 350, generates the requested data and transmits it via the network interface 360 to the network management system.

The base station 120a can measure the network quality, generate the data indicative of network quality, and transmit the data at various times, which may be different from each other. In one embodiment, the base station 120a measures the network quality continuously. This is particularly advantageous when measuring an interference measurement. In one embodiment, the base station 120a measures the network quality periodically. This may be particularly advantageous when measuring data load, although this can also be measured continuously. As mentioned above, in one embodiment, the base station measures the network quality in response to a request for information.

The base station 120a can generate the data indicative of network quality based on measurements taken continuously, periodically, or upon request. The data may be generated by compiling a number of measurements taken over a period of time. For example, the base station 120a may generate data indicative of the packet loss rate over a 24-hour period. The base station may generate an alert if a continuous measurement of interference level is above a threshold for a predetermined period of time. The data may be generated upon request based on a measurement performed upon request or on a measurement which was performed previously.

In certain embodiments, the base station 120a measures and generates the data in response to stimuli other than receiving a request for information. For example, in one embodiment, if the interference level is above a threshold, the base station 120a measures and generates data indicative of the traffic load or packet loss rate. The base station can measure and/or report data based on a variety of triggers. Such triggers can be based on the base station power class, the backhaul capacity, or association. Exemplary base station power classes include macro (43 dBm), pico (30 dBm), and femto (<20 dBm). Exemplary characterizations of backhaul capacity include wired, wireless, high capacity and variable capacity. The association may be open or closed. The trigger can also be based on characteristics of served subscriber handsets. The trigger can be based on the UE power class, category, or association. For example, the trigger can be based on the number of netbooks or laptop data cards being serviced.

The base station 120a transmits the data to the network management system 130 periodically, continuously, or upon request. For example, in one embodiment, the base station 120a continuously measures the packet loss rate, compiles the data hourly, and sends a report to the network management system once a day. In other embodiments, the base station 120a transmits the data to the network management system in response to stimuli other than receiving a request for information, including when the data, such as an alert, is generated.

In one embodiment, the base station 120a receives instructions from the network management system 130 via the network interface 360. Once receiving the instructions, the processor 310, performs the requested function, potentially including transmitting commands or data to the air interface 350 or network interface 360. In one embodiment, the received instructions include commands to reduce the transmit power level. In response, the processor 310 sends a command to the air interface 350 to reduce the transmit power level. In another embodiment, the received instructions include commands to initiate communications with another base station. In response, the processor 310 sends communication data to another base station via the air interface 350 and antenna 355, via the network interface 360, or via a separate station-to-station interface, which can include a wired or wireless link.

As will be appreciated by those skilled in the art, the base station is also configured to facilitate communication between users of subscriber handsets and other users. The base station transmits and receives signal from subscriber handsets via the antenna 355 and air interface 350 and transmits and receives signals over the network, which may be connected to the Internet and a PSTN (public switched telephone network) via the network interface 350.

Figure 4:
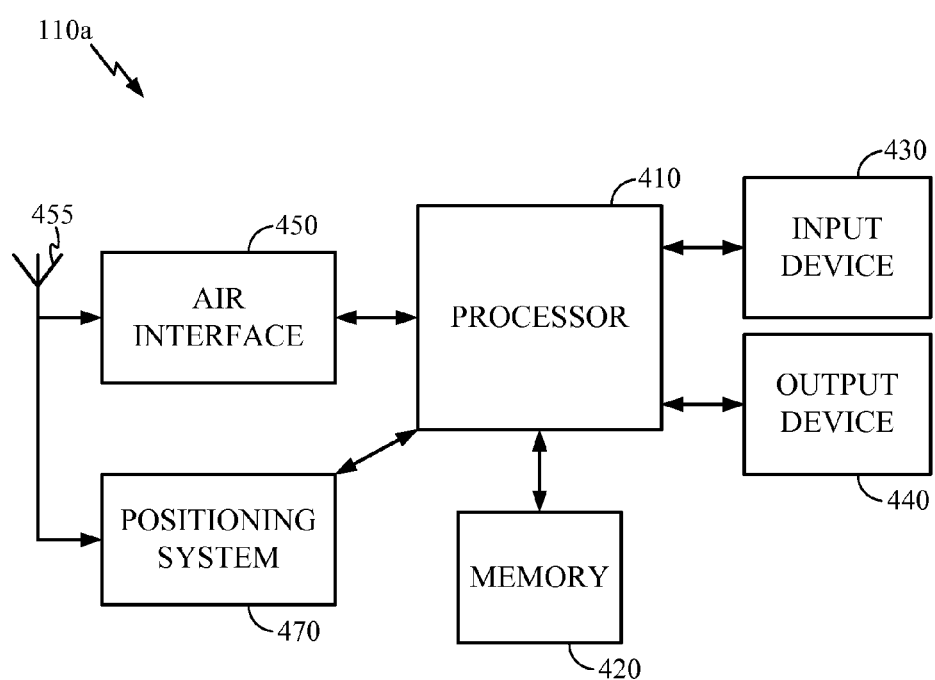
FIG. 4 is a functional block diagram of a subscriber handset according to one embodiment.

The user equipment (UE), or subscriber handset 110a, as shown in FIG. 4, can be a cellular phone, such as those known in the art, configured to perform the functions as described below. The cellular phone may be a smart phone, a generic term for a cellular phone with advanced PC-like functionality.

The subscriber handset 110a includes a processor 410 in data communication with a memory 420, an input device 430, and an output device 440. The processor is further in data communication with an air interface 450. Although described separately, it is to be appreciated that functional blocks described with respect to the subscriber handset 110a need not be separate structural elements. For example, the processor 410 and memory 420 may be embodied in a single chip. Similarly, the processor 410 and air interface 450 may be embodied in a single chip.

The processor 410 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The processor 410 can be coupled, via one or more buses, to read information from or write information to memory 420. The processor may additionally, or in the alternative, contain memory, such as processor registers. The memory 420 can include processor cache, including a multi-level hierarchical cache in which different levels have different capacities and access speeds. The memory 420 can also include random access memory (RAM), other volatile storage devices, or non-volatile storage devices.

The processor 410 is also coupled to an input device 430 and an output device 440 for, respectively, receiving input from and providing output to, a user of the subscriber handset 110*a*. As non-limiting examples, the subscriber handset 110*a* can include a microphone for receiving audio data, such as voice; a keypad for entering data such a telephone numbers, text, or handset selections or commands; a speaker for playing audio data, such as voice or music, a separate speaker for playing ringtones; a vibrator to indicate an incoming call through vibration; and a screen for displaying data. Other suitable input and output devices are described above with respect to the network management system 130.

The processor 410 is further coupled to an air interface 450. The air interface 450 prepares data generated by the processor 410 for transmission via the antenna 455 according to one or more wireless standards and also demodulates data received via the antenna 455 according to one or more wireless standards.

The subscriber handset 110*a* also includes a GPS 470 configured to determine a geographic position of the subscriber handset from signals received over the antenna 455 as is known in the art. The subscriber handset 110*a* may have a separate antenna (not shown) for this purpose. Although one antenna 455 is shown, the antenna 455 may be multiple antennas, enabling beamforming or multiple-input/multiple-output communications and increasing spatial diversity.

The subscriber handset 110*a* is configured to generate data indicative of network quality and to transmit the data to the network management system. The subscriber handset 110 can also transmit the data to the base station, which is then transmitted to the network management system. As described above, in one embodiment, the subscriber handset 110*a* transmits data including an indication of the presence or absence of coverage, a received signal strength measurement, an indication of a dropped call, the number of attempted calls before a successful call, or an interference measurement.

In one embodiment, the subscriber handset 110*a* generates data indicative of coverage based on the reception (or lack thereof) of a coverage signal received from a base station 120*a* over the antenna 455. In other embodiments, the subscriber handset 110*a* generates data indicative of coverage strength based on the same information. The data can be generated by the air interface 450 or the processor 410.

In one embodiment, whenever an unsuccessful call attempt is made or whenever a call is dropped, the processor 410 generates data indicative of this fact and stores it in the memory 420. In one embodiment, the air interface 350 receives requests for information from the network management system (possibly via the base station) as described above with respect to FIG. 2. Once receiving the request for information via the air interface 450, the processor 410, potentially in conjunction with the antenna 455 and air interface 450, generates the requested data and transmit it via the air interface 450 to the network management system (or base station).

The subscriber handset 110*a* can measure the network quality, generate the data indicative of network quality, and transmit the data at various times, which may be different from each other. In one embodiment, the subscriber handset 110*a* measures the network quality continuously. This is particularly advantageous when measuring coverage or received signal strength. In another embodiment, the subscriber handset 110*a* measures the network quality periodically. As mentioned above, in one embodiment, the subscriber handset 110*a* measures the network quality in response to a request for information.

The subscriber handset 110*a* can generate the data indicative of network quality based on measurements taken continuously, periodically, or upon request. The data may be generated by compiling a number of measurements taken over a period of time. For example, in one embodiment, the subscriber handset 110*a* generates data indicative of the coverage received over a 24-hour period. The data may be generated upon request based on a measurement performed upon request or on a measurement which was performed previously.

In certain embodiments, the subscriber handset 110*a* measures and generates the data in response to stimuli other than receiving a request for information. For example, in one embodiment, if the subscriber handset 110*a* experiences a call drop at a particular location, the subscriber handset 110*a* generates data indicative of this drop and transmits it when appropriate.

The subscriber handset 110*a* can transmit the data to the network management system 130 periodically, continuously, upon request, or whenever possible. For example, in one embodiment, the subscriber handset 110*a* continuously measures network coverage, compiles the data hourly, and sends a report to the network management system once a day. In certain embodiments, the subscriber handset 110*a* transmits the data to the network management system 130 in response to stimuli other than receiving a request for information, including when the data, such as a call drop alert, is generated and network coverage is next available.

It is to be appreciated that when network coverage is unavailable, transmission of data to the network management system or base station may be frustrated. Thus, in one embodiment, data which is to be transmitted is stored in the memory 420 until network coverage is reestablished. Further, it may be advantageous to transmit the data when the network connection is not in use, such as a phone call or a web-browsing session. Thus, in one embodiment, data which is to be transmitted is stored in the memory 420 until the subscriber handset 110*a* is not in use. In another embodiment, the data is transmitted when the subscriber handset 110*a* is powered up or powered down.

The transmitted data can include a position of the subscriber handset 110*a*, as determined by the GPS 470, and an indication of network quality at the position. The transmitted data can also include a time associated with the position and network quality, as determined by a clock (not shown) included in the processor 410 or separate.

In one embodiment, the subscriber handset 110*a* receives instructions from the network management system 130 over the air interface 450. These instructions may be routed through a base station 120*a*. Once receiving the instructions, the processor 410, performs the requested function, potentially including transmitting commands or data to the air interface 450. In one embodiment, the received instructions instruct the subscriber handset 110*a* to begin communication with a base station it is not currently in communication with in an attempt to redistribute traffic load.

As will be appreciated by those skilled in the art, the subscriber handset 110*a* is also configured to facilitate communication between users of the handset and other users. The subscriber handset 110*a* transmits and receives signal from base stations via the antenna 455 and air interface 450, the base stations interconnecting the subscriber handset 110a with other handsets, the Internet, and a PSTN.

Figure 5:
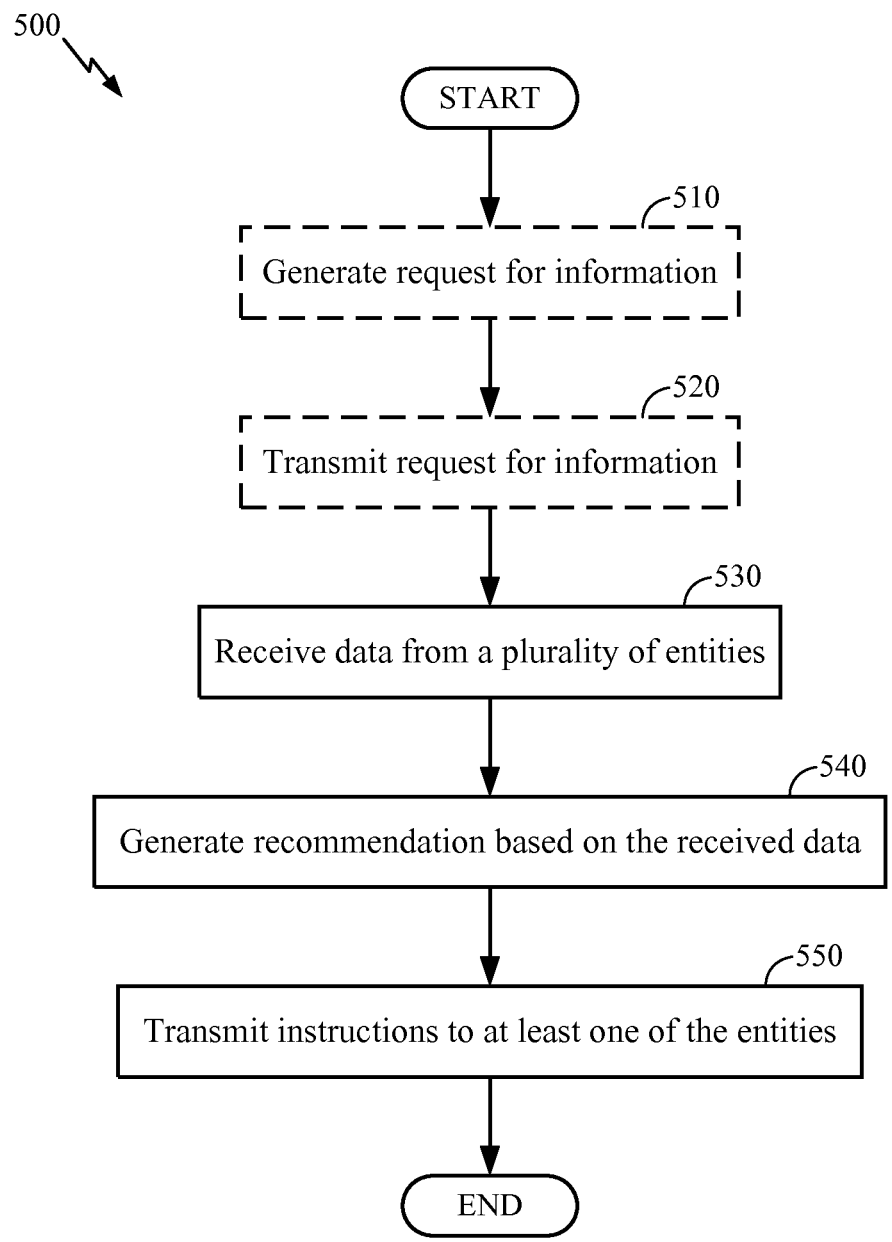
FIG. 5 is a flowchart of an exemplary method of managing a network.
Figure 6:
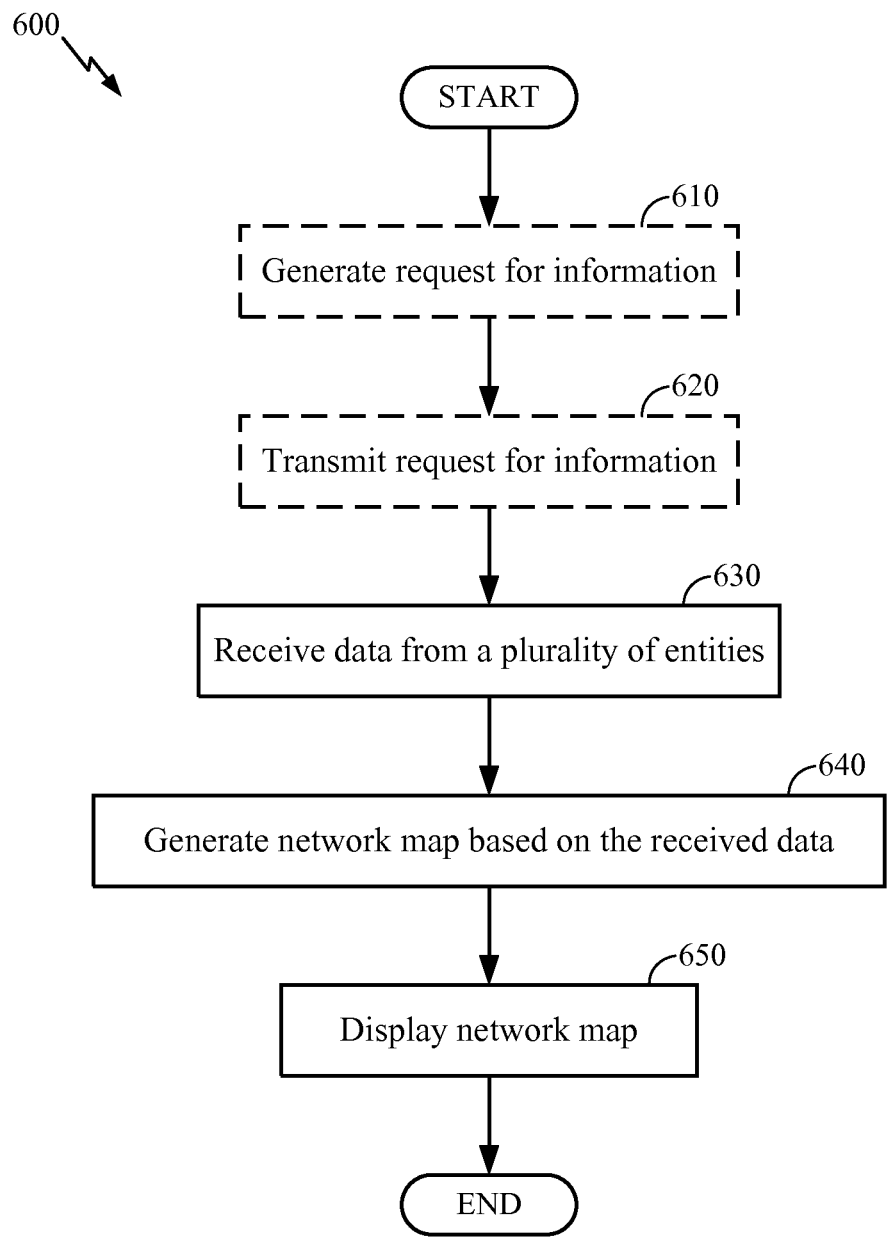
FIG. 6 is a flowchart of an exemplary method of generating a network map.

Referring to FIG. 5, a process 500 for managing a network is described. It is understood that the specific order or hierarchy of steps in the processes disclosed, including the process 500 of FIG. 5 and the process 600 of FIG. 6, is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. Further, it is understood that steps in the processes disclosed are optional and not essential to the practice of the disclosed processes.

The process 500 begins, in block 510 with the generation of a request for information. As described above, in one embodiment, the network management system 130 generates requests from information, and the request is generated automatically by the processor 210 or by a user via the input device 230. The request for information may include the type of information desired, including interference measurements or received signal strength measurements as discussed above.

Continuing to block 520, the request for information is transmitted. In one embodiment, the request is transmitted by the network management system 130, via the transmitter 254 to one or more base stations and/or one or more subscriber handsets. A request for information from the subscriber handsets can be transmitted to the base stations, which can further request the information from the subscriber handsets or respond to the request based on previously received information.

Next, in block 530, data is received from a plurality of entities. In one embodiment, the data is received by the network management system 130 via the receiver 252. The information can be received without the generation and transmission of requests in blocks 510 and 520. The data can be received from a number of base stations, a number of subscriber handsets, or a combination of base stations and handsets. In one embodiment, the data is received from a single base station which has accumulated data from a plurality of subscriber handsets. It is to be understood that receiving data from a plurality of entities encompasses receiving data originating from a plurality of entities even if the data is finally received from a single source. Likewise, receiving data from a plurality of subscriber handsets encompasses receiving data originated from a plurality of subscriber handsets even if the data is routed through a base station or a network. Receiving data from a plurality of base stations encompasses receiving data originated from a plurality of base stations even if the data is routed through a network.

The received data can include, among other things, an indication of network quality, a geographic position, a time, and a frequency band. The indication of network quality can include, among other things, as described above, an interference measurement or an indication of coverage.

After receiving the data, in block 540, a recommendation is generated based on the received data. In one embodiment, the recommendation is generated by the processor 210 of the network management system 130. In one embodiment, the recommendation is an alert, recommending that action be taken to rectify a problem. In another embodiment, the recommendation includes recommending the deployment of an additional transmitter (base station or relay) or to mitigate interference.

In one embodiment, the recommendation is displayed or stored. The recommendation can be displayed on the output device 240 or stored in the memory 220 of the network management system 130. In the embodiment illustrated in FIG. 5, the process 500 continues to block 550 where instructions are transmitted to at least one of the entities, the instructions based on the recommendation. In one embodiment, the instructions are transmitted by the transmitter 254 of the network management system 130.

In one embodiment, the instructions include commands to perform transmit power control (TPC) or channel orthogonalization. In another embodiment, the instructions include commands to initiate communications between base stations or to redistribute traffic between base stations. The instructions can be sent to more than one of the entities, which can include base stations and subscriber handsets. In one embodiment, instructions are sent to subscriber handsets via the base stations. For example, the instructions may instruct specific subscriber handsets communicating with a first base station to hand off to a second base station.

A process 600 of generating a network map is described with respect to FIG. 6. The process begins in block 610, with the generation of a request for information, continues to block 620 with the transmission of the request, and continues to block 630 with the reception of data from a plurality of entities. These steps can be performed as described with respect to blocks 510, 520, and 530 of FIG. 5, respectively.

Next, in block 650, a network map is generated based on the received data. In one embodiment, the network map is generated by the processor 210 of the network management system. In one embodiment, the network map is a coverage map indicating the presence and absence of network coverage at specific locations. The network map can also indicate the received signal strength, or relative received signal strength, at specific locations. The network map can indicate areas in which base stations are overloaded based on data indicative of high data load, high packet loss rate, or high interference measurements. As described above, in one embodiment, the network map is time-dependent.

In one embodiment, the network map is stored in the memory 220 of the network management system 130. Once the network map is generated, the network map is displayed in block 650. In one embodiment, the network map is displayed on the output device 240 of the network management system 130. The network map may be displayed as part of a user interface. The network map can facilitate future network planning or current network management.

Figure 7:
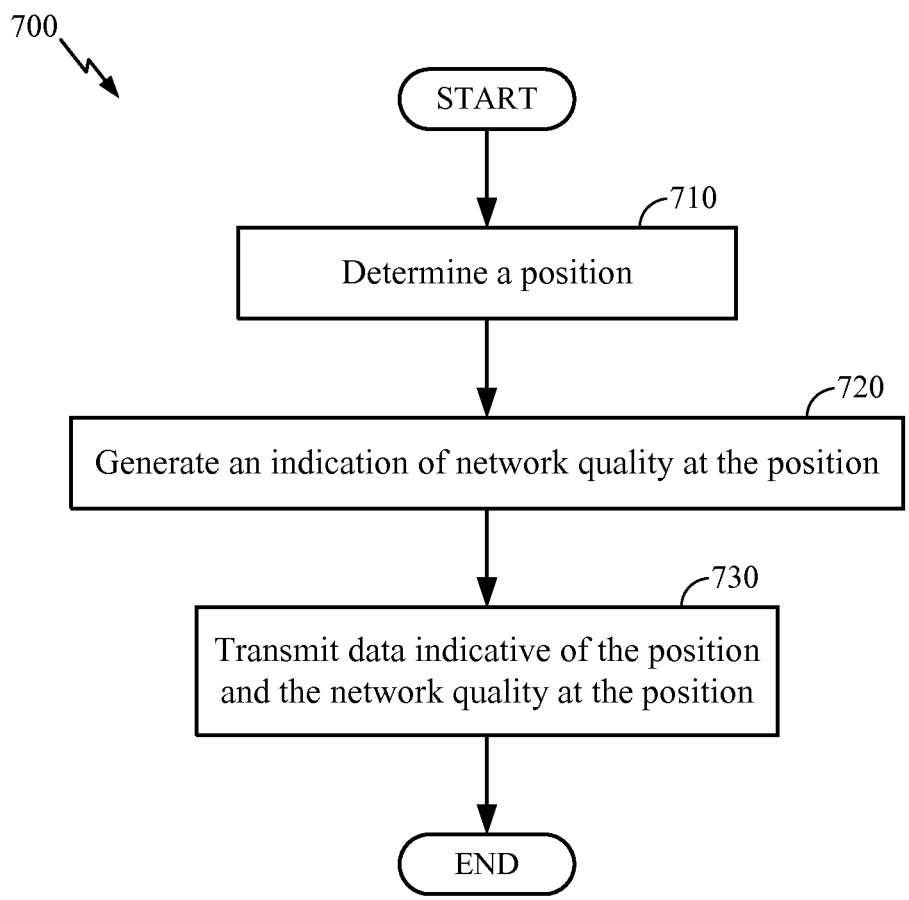
FIG. 7 is flowchart of an exemplary method of transmitting network quality information.
Figure 8:
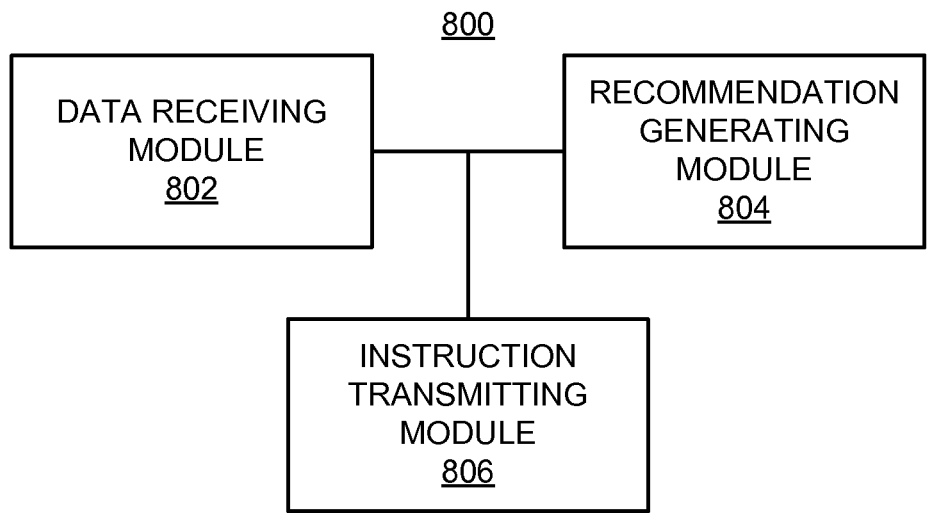
FIGS. 8-14 are simplified block diagrams of several sample aspects of apparatuses configured to provide local breakout operations as taught herein.

A process 700 of transmitting network quality information is described with respect to FIG. 7. In one embodiment, the process 700 is performed by the subscriber handset 110a of FIG. 1. The process 700 begins in block 700, with the determination of a position. In one embodiment, the determination of a position is performed by the positioning system 470 of FIG. 4.

In one embodiment, determining a position includes determining an absolute position, such as a latitude and longitude. In another embodiment, a relative position is determined. For example, in one embodiment, the subscriber handset 110a receives one or more signals containing a base station identifier. From these signals, the subscriber handset 110a determines its position as being near to or far from particular base stations based on the received signal strength or timing of the signals containing particular base station identifiers.

In one embodiment, the position is determined to be a particular distance from or within a particular distance of a particular base station. In another embodiment, the position is further determined to a particular distance from or within a particular distance of another particular base station.

Continuing to block 720, a indication of network quality at the position is generated. It is to be appreciated that "at the position" refers to the network quality at the position, not to where the indication is generated. In one embodiment, the generating is performed by the processor 410 of FIG. 4. As described above with respect to FIG. 4, the indication of network quality can include an indication of the presence or absence of coverage, a received signal strength measurement, an indication of a dropped call, the number of attempted calls before a successful call, or an interference measurement.

Finally, in block 730, data indicative of the position and the network quality at the position is transmitted. In one embodiment, the data is transmitted via the air interface 450 and antenna 455 of FIG. 4, and the data is received by either a base station 120a or the network management system 130. The data indicative of the position can include either an absolute position or a relative position. In one embodiment, the data indicative of position is the relative strength of various received signals containing base station identifiers. Based on this received information, further processing can be performed, at the subscriber handset 110a, the base station 120a, or the network management system 130, to determine the position, such as an area in which the subscriber handset 110a would like receive such signal.

As described above with respect to FIG. 4, the data can be transmitted periodically, continuously, upon request, or whenever possible. For example, in one embodiment, the subscriber handset 110a continuously measures network coverage, compiles the data hourly, and sends a report to the network management system once a day. In certain embodiments, the subscriber handset 110a transmits the data to the network management system 130 in response to stimuli other than receiving a request for information, including when the data, such as a call drop alert, is generated and network coverage is next available.

The functionality described herein (e.g., with regard to one or more of the accompanying figures) may correspond in some aspects to similarly designated "means for" functionality in the appended claims. Referring to FIGS. 8-14, apparatuses 800, 900, 1000, 1100, 1200, 1300, and 1400 are represented as a series of interrelated functional modules. With respect to FIG. 8, a data receiving module 802 may correspond at least in some aspects to, for example, a network interface, an air interface, a receiver, or one or more antennas as discussed herein. A recommendation generation module 804 may correspond at least in some aspects to, for example, a processor as discussed herein. An instruction transmitting module 806 may correspond at least in some aspects to, for example, a network interface, an air interface, a transmitter, or one or more antennas as discussed herein.

Figure 9:
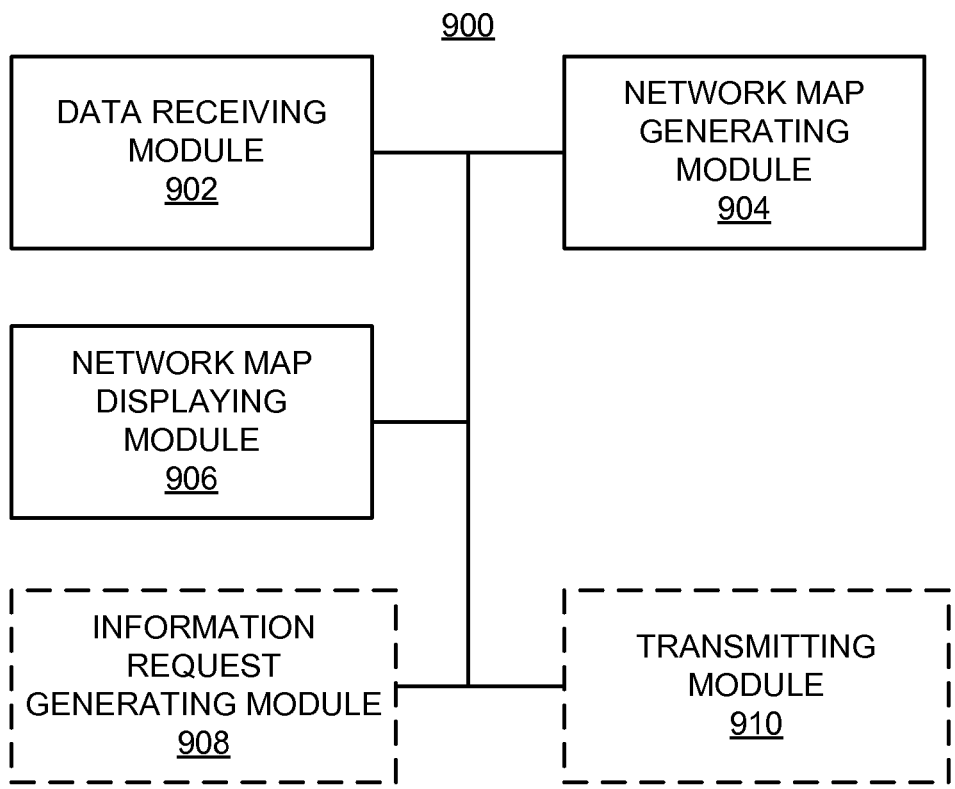

With respect to FIG. 9, a data receiving module 902 may correspond at least in some aspects to, for example, a network interface, an air interface, a receiver, or one or more antennas as discussed herein. A network map generating module 904 may correspond at least in some aspects to, for example, a processor as discussed herein. A network map displaying module 906 may correspond at least in some aspects to, for example, an output device, a screen, a display, or a printer as discussed herein. An information request generating module 908 may correspond at least in some aspects to, for example, an input device, a graphical user interface, or a processor as discussed herein. A transmitting module 910 may correspond at least in some aspects to, for example, a network interface, an air interface, a transmitter, or one or more antennas as described herein.

Figure 10:
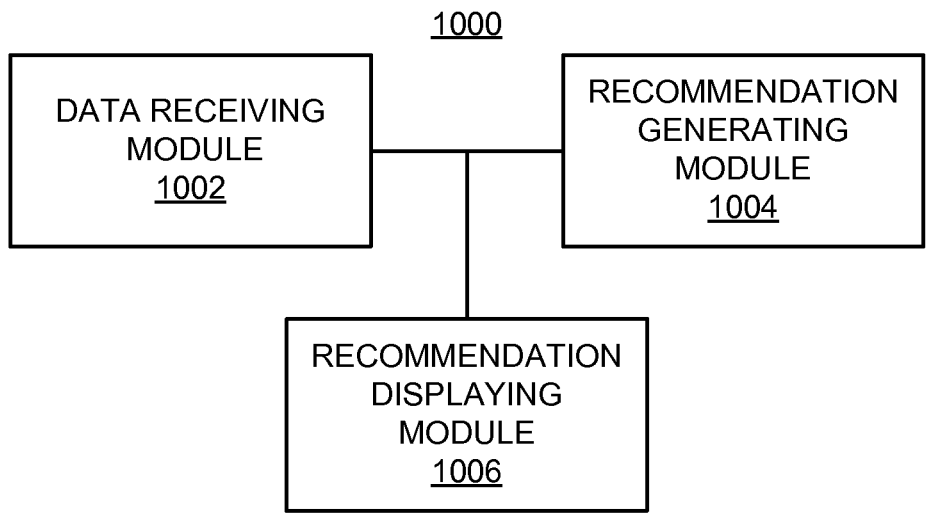

With respect to FIG. 10, a data receiving module 1002 may correspond at least in some aspects to, for example, a network interface, an air interface, a receiver, or one or more antennas as discussed herein. A recommendation generating module 1004 may correspond at least in some aspects to, for example, a processor as discussed herein. A recommendation displaying module 1006 may correspond at least in some aspects to, for example, an output device, a screen, a display, or a printer as discussed herein.

Figure 11:
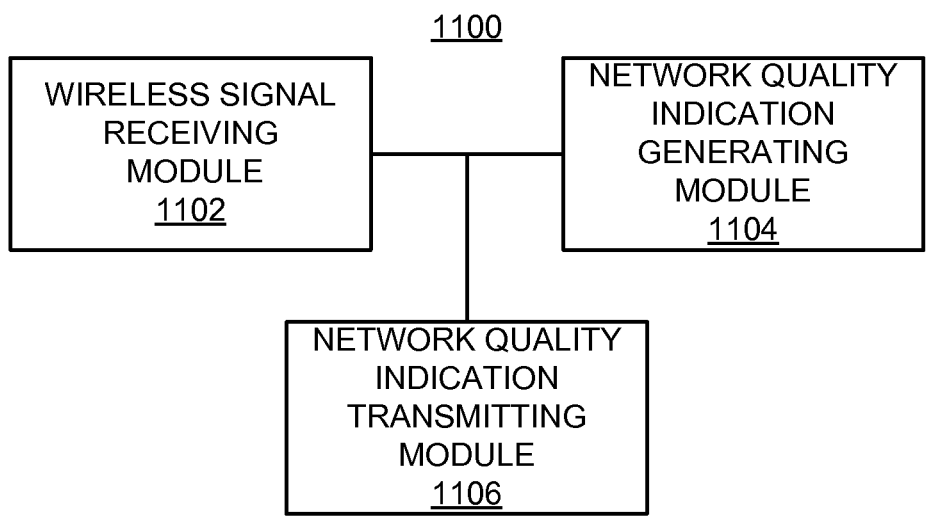

With respect to FIG. 11, a wireless signal receiving module 1102 may correspond at least in some aspects to, for example, a network interface, an air interface, a receiver, or one or more antennas as discussed herein. A network quality indication generating module 1104 may correspond at least in some aspects to, for example, a processor as discussed herein. A network quality indication transmitting module 1106 may correspond at least in some aspects to, for example, a network interface, an air interface, a transmitter, or one or more antennas as described herein.

Figure 12:
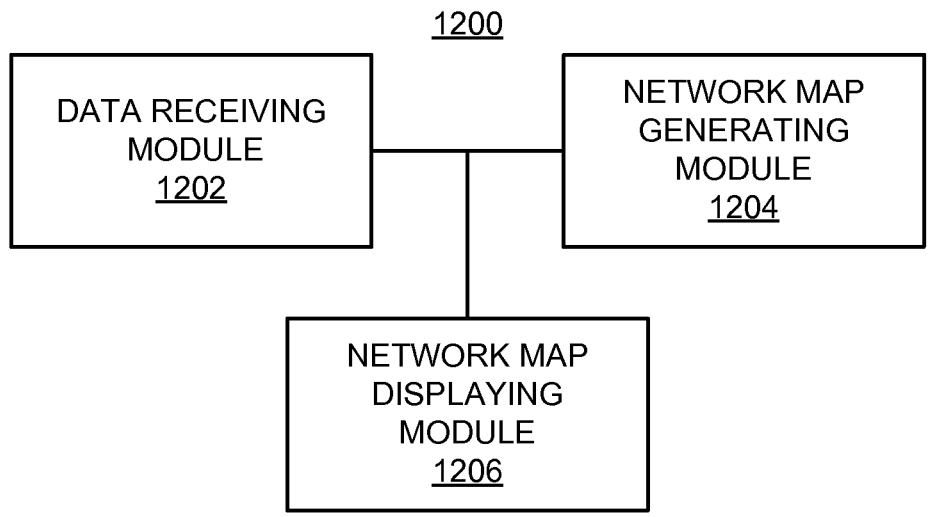

With respect to FIG. 12, a data receiving module 1202 may correspond at least in some aspects to, for example, a network interface, an air interface, a receiver, or one or more antennas as discussed herein. A network map generating module 1204 may correspond at least in some aspects to, for example, a processor as discussed herein. A network map displaying module 1206 may correspond at least in some aspects to, for example, an output device, a screen, a display, or a printer as discussed herein.

Figure 13:
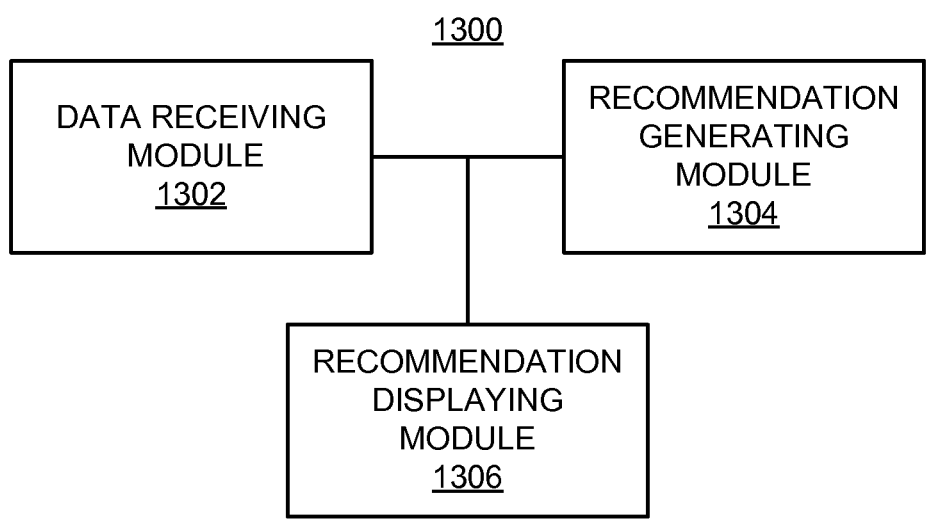

With respect to FIG. 13, a data receiving module 1302 may correspond at least in some aspects to, for example, a network interface, an air interface, a receiver, or one or more antennas as discussed herein. A recommendation generating module 1304 may correspond at least in some aspects to, for example, a processor as discussed herein. A recommendation displaying module 1306 may correspond at least in some aspects to, for example, an output device, a screen, a display, or a printer as discussed herein.

Figure 14:
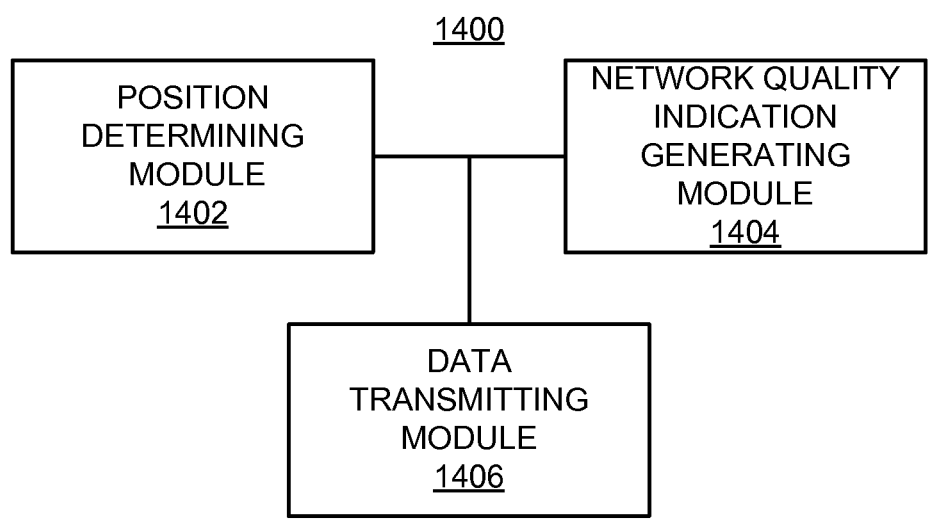

With respect to FIG. 14, a position determining module 1402 may correspond at least in some aspects to, for example, a global positioning system (GPS) or a triangulation system as discussed herein. A network quality indication generating module 1404 may correspond at least in some aspects to, for example, a processor as discussed herein. A data transmitting module 1406 may correspond at least in some aspects to, for example, a network interface, an air interface, a transmitter, or one or more antennas as described herein.

The functionality of the modules of FIGS. 8-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof The functionality of these modules also may be implemented in some other manner as taught herein. In some aspects one or more of any dashed blocks in FIGS. 8-14 are optional.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that can be accessed by a computer. By way of example, and not limitation, such computer readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A base station comprising:
an air interface configured to receive wireless signals;
a processor configured to generate an indication of network quality based on the received wireless signals, the received wireless signals including at least one signal communicated to the base station from at least one subscriber handset and at least one signal, from at least one other base station, detected by the base station; and
a network interface configured to transmit the indication of network quality.

2. The base station of claim 1, wherein the indication of network quality is an alert transmitted when a measured interference level is above a predetermined threshold for a predetermined period of time.

3. The base station of claim 1, wherein the indication of network quality is a continuous measurement.

4. The base station of claim 1, wherein the processor is configured to generate an indication of network quality in response to a trigger, the trigger based on at least one of a power class, a backhaul capacity, or an association.

5. The base station of claim 1, wherein the network interface is configured to transmit the indication of network quality in response to a trigger, the trigger based on at least one of a power class, a backhaul capacity, or an association.

6. A method of transmitting network quality information, the method comprising:
receiving wireless signals;
generating an indication of network quality based on the received wireless signals, the received wireless signals including at least one signal communicated to a base station from at least one subscriber handset and at least one signal, from at least one other base station, detected by the base station; and
transmitting the indication of network quality.

7. The method of claim 6 further comprising receiving a request for information, wherein transmitting the indication of network quality is performed in response to receiving the request.

8. The method of claim 6, wherein the received wireless signals originate from one or more subscriber handsets.

9. The method of claim 6, wherein the indication of network quality comprises data indicative of at least one of: an interference measurement, a data load, or a packet loss rate.

10. A base station comprising:
means for receiving wireless signals;
means for generating an indication of network quality based on the received wireless signals, the received wireless signals including at least one signal communicated to the base station from at least one subscriber handset and at least one signal, from at least one other base station, detected by the base station; and
means for transmitting the indication of network quality.

11. The base station of claim 10, wherein the received wireless signals originate from one or more subscriber handsets.

12. The base station of claim 10, wherein the indication of network quality comprises data indicative of at least one of: an interference measurement, a data load, or a packet loss rate.

13. A computer program product comprising:
a non-transitory computer readable medium further comprising:

code for causing at least one computer to receive wireless signals;

code for causing at least one computer to generate an indication of network quality based on the received wireless signals, the received wireless signals including at least one signal communicated to abuse station from at least one subscriber handset and at least one signal, from at least one other base station, detected by the base station; and code for causing at least one computer to transmit the indication of network quality.

14. The computer program product of claim 13, wherein the received wireless signal originate from one or more subscriber handsets.

15. The computer program product of claim 13, wherein the indication of network quality comprises data indicative of at least one of: an interference measurement, a data load, or a packet loss rate.

16. The base station of claim 1, further comprising a transmitter configured to communicate with at least one other base station, and wherein the processor is configured to generate a recommendation and initiate communications with the at least one other base station.

17. The base station of claim 16, wherein the recommendation is to mitigate interference by at least one of power control, radio resource orthogonalization, or both.

18. The method of claim 6, further comprising:
generating a recommendation; and
initiating communications with the at least one other base station.

19. The method of claim 18, wherein the recommendation is to mitigate interference by at least one of power control, radio resource orthogonalization, or both.

20. The base station of claim 10, further comprising:
means for generating a recommendation; and
means for initiating communications with the at least one other base station.

21. The base station of claim 20, wherein the recommendation is to mitigate interference by at least one of power control, radio resource orthogonalization, or both.

22. The computer program product of claim 13, further comprising:
code for causing at least one computer to generate a recommendation; and
code for causing at least one computer to initiate communications with the at least one other base station.

23. The computer program product of claim 22, wherein the recommendation is to mitigate interference by at least one of power control, radio resource orthogonalization, or both.

24. The base station of claim 1, wherein the processor is further configured to detect interference caused by the at least one base other base station and the indication of network quality comprises one or more of an identifier of the at least one other base station and a measure of the interference.

25. The method of claim 6, further comprising detecting interference caused by the at least one base other base station, wherein the indication of network quality comprises one or more of an identifier of the at least one other base station and a measure of the interference.

26. The base station of claim 10, further comprising means for detecting interference caused by the at least one base other base station, wherein the indication of network quality comprises one or more of an identifier of the at least one other base station and a measure of the interference.

27. The product of claim 13, further comprising code for detecting interference caused by the at least one base other base station, wherein the indication of network quality comprises one or more of an identifier of the at least one other base station and a measure of the interference.

* * * * *